(12) United States Patent
Sahl et al.

(10) Patent No.: US 10,733,260 B1
(45) Date of Patent: Aug. 4, 2020

(54) PAGE DISPLAY BY HOSTED BROWSER WITHIN CONTROLLING BROWSER

(71) Applicant: Microsoft Technology Licensing, LLC, Redmond, WA (US)

(72) Inventors: Todd A. Sahl, Seattle, WA (US); Tony E. Schreiner, Bellevue, WA (US); Wenming Ju, Bellevue, WA (US); Thomas W. Bolds, Seattle, WA (US); Corey M. Bloodstein, Redmond, WA (US); Venkatraman V. Kudallur, Redmond, WA (US); Xiaoying Huang, Bellevue, WA (US); Navin Agarwal, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/403,186

(22) Filed: May 3, 2019

(51) Int. Cl.
*G06F 21/12* (2013.01)
*G06F 16/957* (2019.01)
*G06F 16/955* (2019.01)
*G06F 3/0484* (2013.01)
*G06F 40/14* (2020.01)

(52) U.S. Cl.
CPC ........ *G06F 16/9577* (2019.01); *G06F 3/0484* (2013.01); *G06F 16/9558* (2019.01); *G06F 21/128* (2013.01); *G06F 40/14* (2020.01)

(58) Field of Classification Search
CPC .......................... G06F 16/9577; G06F 21/128
See application file for complete search history.

(56) References Cited

U.S. PATENT DOCUMENTS

2013/0104060 A1* 4/2013 Chandra ............... G06F 16/957
715/760

* cited by examiner

*Primary Examiner* — Shen Shiau
(74) *Attorney, Agent, or Firm* — Fiala & Weaver P.L.L.C.

(57) ABSTRACT

Web pages compatible with different web browsers are seamlessly rendered within the same tab of a single web browser window. A first browser is executed in a computing device, and has an open browser window. A request is received at the first browser to navigate to a first page. The first page is determined to be incompatible with the first browser and compatible with a second browser. Under control by the first browser, an instance of the second browser is invoked without a browser window opening for the instance of the second browser. An address of the first page is provided to the instance of the second browser. The instance of the second browser renders the first page within a tab in the open browser window of the first browser.

20 Claims, 9 Drawing Sheets

PAGE DISPLAY BY HOSTED BROWSER WITHIN CONTROLLING BROWSER

BACKGROUND

A web browser (or just "browser") is a software application for accessing information on the World Wide Web. A web browser is installed on user devices to enable users of those devices to retrieve resources (e.g., individual web pages, images, videos, etc.) from a web server and display them on the user devices. Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user device.

As web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for enabling display of content in a browser that is not compatible with the browser (e.g., cannot be rendered by the browser due to a lack of capability of the browser, such as inability to handle particular instructions, fields, parameters, etc.). A first browser and a second browser may be present in a user device. The first browser receives a request to navigate to a first page. The first browser determines that the first page is incompatible with the first browser and compatible with a second browser. The first browser is configured to execute an instance of the second browser without a browser window opening for the instance of the second browser. The first browser provides an address of the first page to the instance of the second browser. The second browser is configured to render the first page within a browser window tab of a browser window opened by the first browser.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
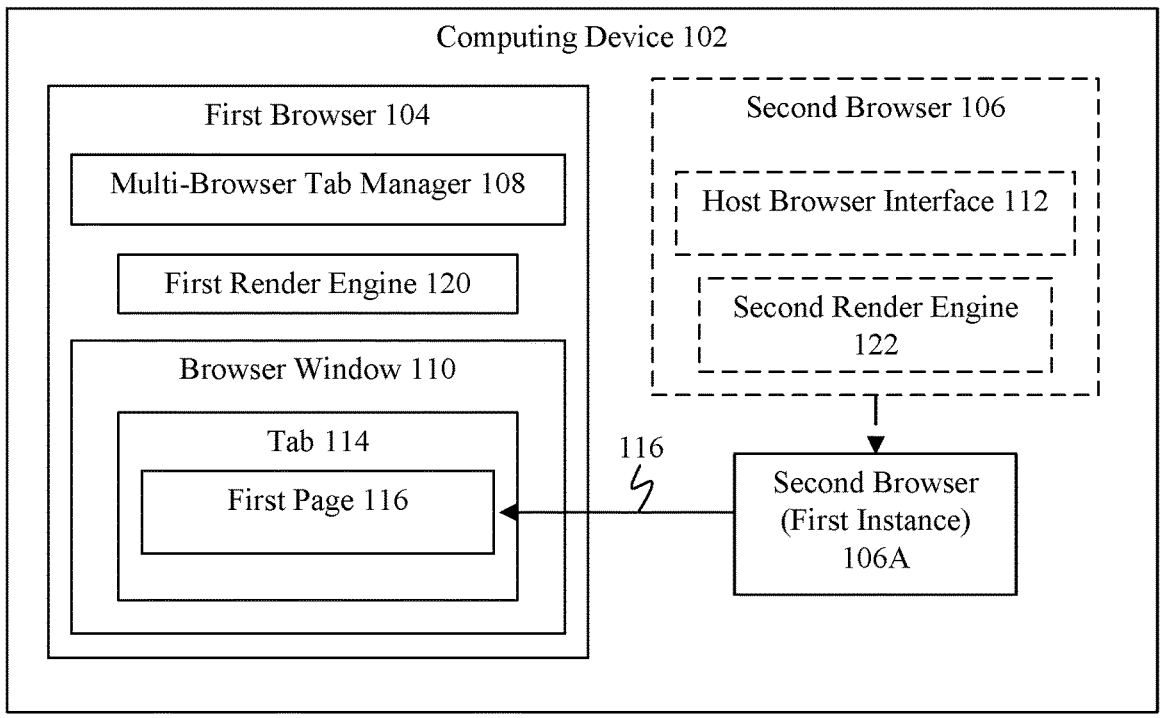
FIG. 1A and FIG. 1B show block diagrams of a system for managing page compatibility between a first (primary) browser and a second (secondary) browser in a computing device, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, as web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions. This is inconvenient for users who are forced to maintain old versions of web browsers so that the content incompatible with more recent browser technology can continue to be accessed.

In the case of a web application, a potential solution to this problem is that the web application be given dual solutions, meaning that multiple versions of the web application are developed and maintained (e.g., for each browser type/version of interest). However, such an approach can consume resources and time. Furthermore, users would need to know which browser version is compatible with which web application. Another solution introduced the notion of auto-switching, where web applications would switch between web browsers based on a specification format that allowed administrators to specify a list of web app sites and the compatible browsers. However, this solution is visible to the user and very distracting. Another solution is introducing the notion of invoking a new browser window for a browser compatible with a web app from an open browser window for an incompatible browser in which the web app was attempted to be opened. While this may be an improvement over other solutions, it has shortfalls including the need to switch between browsers.

Embodiments described herein help address these and other issues related to content compatibility with web browsers. Embodiments described herein enable an integrated approach to running web applications with various compatibilities that does not require third-party extensions or sacrifice user experience. In embodiments, when a page of an application incompatible with a first web browser is to be executed, an instance of a second web browser with which the page is compatible is separately executed without opening a window for that second browser. Instead, the second browser opens a page within the window of the first browser. This enables an effective and efficient user experience by enabling the running of different web applications that have different web browser compatibilities in a same browser window.

In embodiments, when a page of a web application compatible with a second web browser is to be rendered, a multi-browser tab manager of the first browser is configured to invoke an instance of the second web browser to render the page within a tab of a browser window of the first web browser. In embodiments, when a page of a web application compatible with the first web browser is to be rendered, the multi-browser tab manager directs the first web browser to render the page within the tab of the first web browser. In this way, users can easily browse pages within the first web browser that are compatible with either the second web browser or the first web browser.

For example, in an embodiment, a user of a computing device may initiate a navigation in a first browser from a first page to a second page. The second page may be compatible with the first browser or the second browser. Upon determination of which browser the second page is compatible with, the system reacts in a corresponding way. If the second page is compatible with the first browser, the first browser simply obtains the web address for the second page, navigates to the web address, and renders the page. Alternatively, if the second page is compatible with the second browser, an instance of the second browser is invoked (if not already executing) such that the instance of the second browser may receive the web address, navigate to the web address, and render the second page inside the window of the first browser.

In embodiments, users are enabled to navigate a history of pages previously opened within a tab of the first browser, causing each historical page to which the user navigates to be opened in the tab by the corresponding web browser with which they are compatible. A navigation history may be maintained at each of the first web browser and the second web browser for the tab. In this way, each browser may enable a seamless history navigation between historical web pages regardless of the browser they are compatible. Furthermore, and as described in greater detail hereinafter, privacy is maintained between the two browsers, as each browser only stores page data for pages compatible with that browser. For instance, if a page is compatible with the first browser, a page navigation history for the first browser may include page data for the page, but the second browser page navigation history would not store the page data, and vice versa.

Figure 1B:
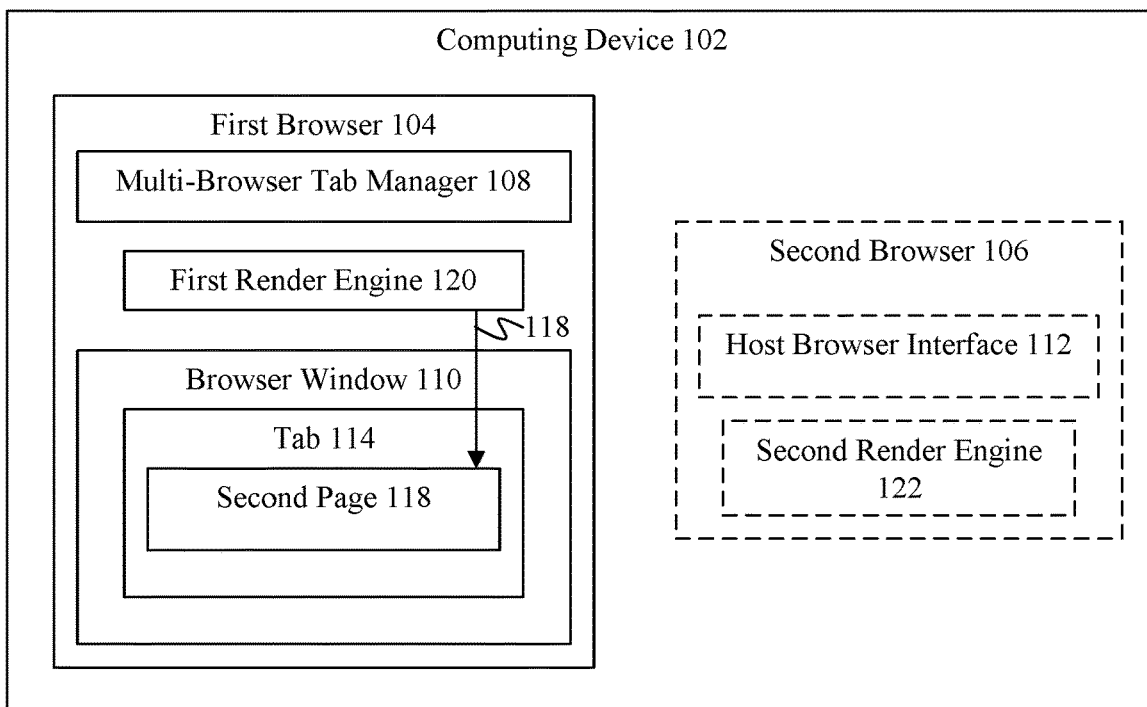

Such embodiments may be implemented in various ways. For instance, FIG. 1A and FIG. 1B show block diagrams of a system 100 for managing page compatibility between a first (primary) browser 104 and a second (secondary) browser 106, according to an example embodiment. As shown in FIG. 1A and FIG. 1B, system 100 includes a computing device 102 that includes first browser 104 and a second browser 106. First browser 104 includes a first render engine 120 and a multi-browser tab manager 108, and has an open browser window 110. Second browser 106 includes a second render engine 122 and a host browser interface 112. In FIG. 1A, second browser 106 has invoked a running instance of itself, referred to as second browser (first instance) 106A. Furthermore, browser window 110 includes a tab 114 displaying a first page 116 that is rendered by second render engine 122 of second browser (first instance) 106A. In FIG. 1B, no instance of second browser 106 executes. Instead, tab 114 displays a second page 118 rendered by first render engine 120 of first browser 104. FIGS. 1A and 1B are further described as follows.

Computing device 102 is a computing device via which a user is enabled to run applications and visit web pages compatible with various web browsers. Computing device 102 may be any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device.

First browser 104 and second browser 106 are web browsers, which are software applications configured for accessing information on the World Wide Web. For instance, first browser 104 and second browser 106 may be configured to receive links to web pages, to retrieve the web pages at the addresses indicated by the links, and to render pages for display to a user of computing device 102. Examples of first browser 104 and second browser 106 include Internet Explorer® or Microsoft Edge®, both developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome™ developed by Google Inc. of Mountain View, Calif. In embodiments, first and second browsers 104 and 106 are different from each other. For instance, first and second browsers 104 and 106 may be different web browser types (e.g., Google® Chrome™ and Microsoft Edge®). Alternatively, first and second browsers 104 and 106 may be different versions of a same web browser.

First render engine 120 and second render engine 122 of first browser 104 and second browser 106, respectively, are each configured to generate a display of content in browser tabs of browser windows, including transforming HTML (hypertext markup language) documents and other resources of a web page into an interactive visual representation. In an embodiment, each of first and second engines 120 and 122 may be configured to perform page layout and rendering of content. Examples of browser engines include Gecko™ used in the Mozilla Firefox® web browser, the WebKit™ engine used by the Apple Safari browser, and Blink™ used in the Google Chrome and Micrsoft Edge Browsers.

Note that second browser 106 shown in dotted line represents the executable file(s) for second browser 106 that may be invoked to generate executing instances of second browser 106, such as second browser (first instance) 106A shown in FIG. 1A. It is noted that executing instances of second browser 106 do include host browser interface 112 and second render engine 122, even though they are not shown illustrated in such instances for reasons of brevity.

As described above, web pages may be compatible with some browsers but not others. For instance, first page 116 may be compatible with second browser 106 but not compatible with first browser 104. In such case, an instance of second browser 106, such as second browser (first instance) 106A of FIG. 1A, may be invoked to render first page 116 within browser window 110 of first browser 104. In this way, pages compatible with second browser 106, but not with first browser 104, may still be displayed to users within first browser 104 without opening a separate browser window for second browser 106, thus providing an improved user experience. This may be accomplished in various ways.

In particular, first browser 104 includes multi-browser tab manager 108. Multi-browser tab manager 108 is configured to receive navigation requests to pages of web applications and determine whether a page to which such a request is directed is compatible with second browser 106 but not first browser 104, such as by conferring with a browser compatibility list. The browser compatibility list may list particular items of content, web applications, file extensions, and/or other identifiers for content that second browser 106 is compatible with (e.g., is capable of rendering) and that first browser 104 is not compatible with. If multi-browser tab manager 108 determines that a requested page is compatible with first browser 104 (e.g., is not identified in the browser compatibility list as incompatible with first browser 104), then first browser 104 receives the web address and renders the page within first browser 104 as normal. Alternatively, if multi-browser tab manager 108 determines that the page is compatible with second browser 106, but not first browser 104 (e.g., is identified in the browser compatibility list as compatible with second browser 106 but incompatible with first browser 104), then second browser (first instance) 106A is invoked to receive the web address of the page and to render the page within first browser 104.

Note that when second browser (first instance) 106A is invoked, second browser (first instance) 106A does not open a browser window as normally would occur. Instead, such a browser window opening is suppressed. For instance, an interface of multi-browser tab manager 108, such an API (application programming interface), may send an invocation request (e.g., as an API call) to second browser 106 through an API of second browser 106. The invocation request may include a parameter specifying that second browser (first instance) 106A does not open a browser window, but instead instructing second browser (first instance) 106A to direct any rendering information for a page to first browser 104, so the page may be opened in the open tab of first browser 104 in which the initial navigation request was received.

Likewise, host browser interface 112 of second browser (first instance) 106A is configured to receive navigation requests inside pages opened by second browser (first instance) 106A in tab 114, and determine whether pages to which such requests are directed are compatible with second browser 106 but not first browser 104. For instance, host browser interface 112 may confer with a browser compatibility list to make the determination. The browser compatibility list accessed by host browser interface 112 may be the same page compatibility used by multi-browser tab manager 108 or a different one. Upon determination that a page is compatible with second browser 106 and not first browser 104, host browser interface 112 renders the page hosted within tab 114 of first browser 104, again without opening a browser window for second browser (first instance) 106A.

For instance, as shown in FIG. 1A, first page 116 was determined to be compatible with second browser 106, but not first browser 104. As such, browser window 110 of first browser 104 displays first page 116 within tab 114, rendered there by second render engine 122 of second browser (first instance) 106A. Alternatively, as shown in FIG. 1B, a second page 118 (opened from a link within first page 116, or by a history navigation) was determined to be compatible with first browser 104. As such, browser window 110 displays second page 118 within tab 114, rendered there by first render engine 120. In the case of FIG. 1B, because second page 118 is compatible with first browser 104, second browser (first instance) 106A is not needed and may therefore be closed, thereby freeing up memory and reducing processor demand in computing device 102.

Accordingly, pages may be opened in tab 114 by first browser 104 or instances of second browser 106, depending on browser capability for the pages, in any page sequence. Such embodiments are described in further detail in the following subsections.

Figure 2:
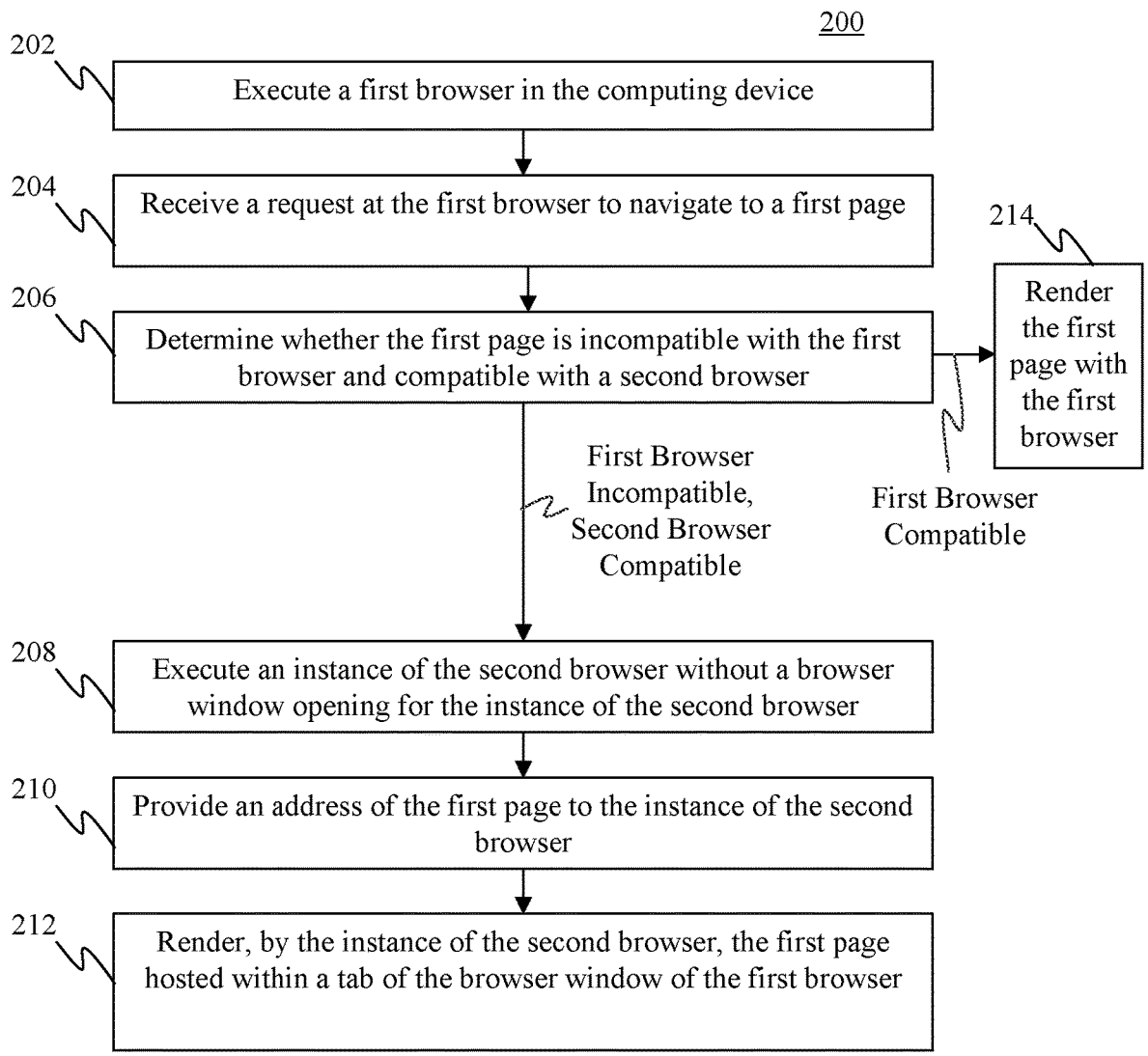
FIG. 2 shows a flowchart of a method for managing page compatibility for the first and second browsers, according to an example embodiment.
Figure 3:
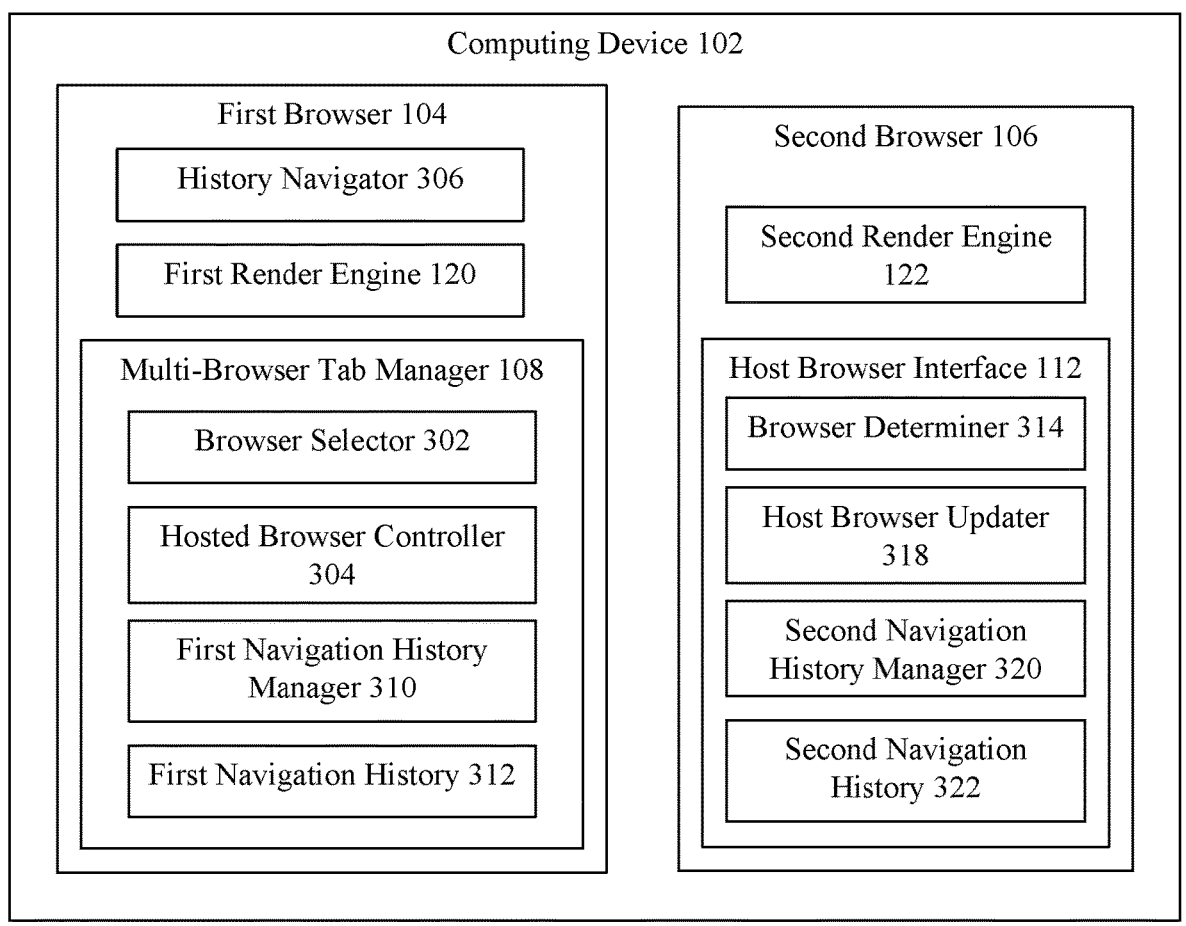
FIG. 3 shows a more detailed block diagram of the system of FIGS. 1A and 1B, according to an example embodiment.

A. Example Embodiments for Opening Pages Based on Determined Browser Compatibility To further illustrate the embodiments disclosed above, FIG. 2 is now described. In particular, FIG. 2 shows a flowchart 200 of a method in a computing device for managing page compatibility for first and second browsers, according to an example embodiment. In an embodiment, flowchart 200 may be implemented by multi-browser tab manager 108 of first browser 104. For purposes of illustration, flowchart 200 is described with reference to FIG. 3. FIG. 3 shows a more detailed block diagram of first browser 104 and second browser 106 of FIG. 1A, according to an example embodiment. As shown in FIG. 3, first browser 104 includes a history navigator 306, first render engine 120, and multi-browser tab manager 108. Second browser 106 includes second render engine 122 and host browser interface 112. Multi-browser tab manager 108 includes a browser selector 302, a hosted browser controller 304, and a first navigation history manager 310. Host browser interface 112 includes a browser determiner 314, a host browser updater 318, and a second navigation history manager 320. Other structural and operational embodiments will be apparent to persons skilled in the relevant art(s) based on the following discussion.

Flowchart 200 of FIG. 2 begins with step 202. In step 202, a first browser is executed in the computing device. For instance, as shown in FIG. 1A, first browser 104 executes in computing device 102. In embodiments, a user of computing device 102 may have invoked first browser 104, or first browser 104 may have been invoked by the invocation of a web application.

In step 204, a request is received at the first browser to navigate to a first page. For instance, and with reference to FIG. 1A and FIG. 3, browser selector 302 may receive a request to navigate to first page 116. In embodiments, the navigation request may be initiated by a user of computing device 102, such as by a link click in a currently opened page in tab 114 or other open tab (causing tab 114 to open), or by a history navigation (e.g., by the user selecting a browser back button or forward button) with tab 114 the active tab. The navigation request includes an address to first page 116, such as in the form of a uniform resource location (URL) or other address type.

In step 206, a determination is made whether the first page is incompatible with the first browser and compatible with a second browser. In an embodiment, browser selector 302 may be configured to determine that first page 116 is compatible with second browser 106 and incompatible with first browser 104. If browser selector 302 determines that first page 116 is compatible with second browser 106 but not with first browser 104, then flowchart 200 progresses to step 208. If browser selector 302 determines that first page 116 is compatible with first browser 104, flowchart 200 progresses to step 214.

In embodiments, browser selector 302 may determine that the first page is compatible with the first browser or the second browser based on an administrator defined list, such as by accessing a browser compatibility list as described above. However, this is not intended to be limiting and browser selector 302 may make this determination in other ways, as would be apparent to persons skilled in the relevant art(s) from the teachings herein.

In step 208, an instance of the second browser is executed without a browser window opening for the instance of the second browser. For instance, and with reference to FIG. 1A and FIG. 3, hosted browser controller 304 may be configured to execute or invoke second browser (first instance) 106A as an instance of second browser 106. As indicated above, and as shown in FIG. 1A, second browser (first instance) 106A is executed without opening a browser window. In embodiments, this instruction may be sent from hosted browser controller 304 to host browser interface 112 of second browser (first instance) 106A via API call or other communications. An API embodiment allows for seamless navigation among page entries that represent pages shown in both first browser 104 and second browser 106. In this way, second browser (first instance) 106A is opened but is not a visible browser.

In step 210, an address of the first page is provided to the instance of the second browser. For instance, and with reference to FIG. 1A and FIG. 3, hosted browser controller 304 may be configured to provide an address of first page 116 to second browser (first instance) 106A in the API call (or other communication) that invoked second browser (first instance) 106A or in a subsequent communication.

In step 212, the first page is rendered by the instance of the second browser and hosted within a tab of the browser window of the first browser. For instance, and with reference to FIG. 1A and FIG. 3, second render engine 122 receives the address provided by hosted browser controller 304 (in step 210), and renders first page 116 within tab 114 based thereon. As indicated above, in this way, first page 116 that is compatible with second browser 106 is displayed seamlessly to a user of computing device 102 within first browser 104 and without opening a separate browser window for second browser 106. In embodiments, this communication may also be accomplished via APIs. Flowchart 200 ends after step 212.

In step 214, the first page is rendered by the first browser. As mentioned above, if first page 116 is determined to be compatible with first browser 104, then first render engine 120 of first browser 104 renders first page 116 in tab 114 in a normal fashion. Flowchart 200 ends after step 214.

Figure 4:
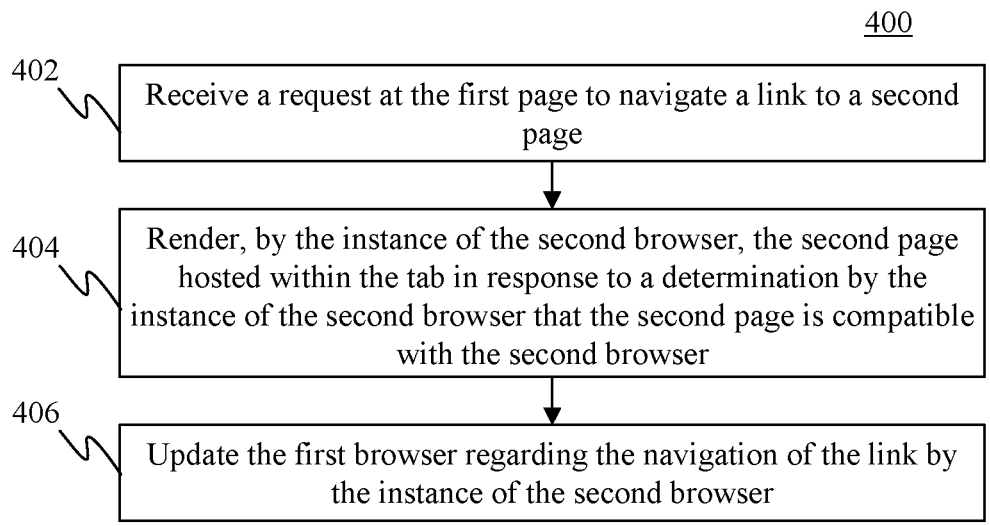
FIGS. 4-6 show flowcharts of methods for managing page compatibility with the first and second browsers for additional pages, according to example embodiments.
Figure 5:
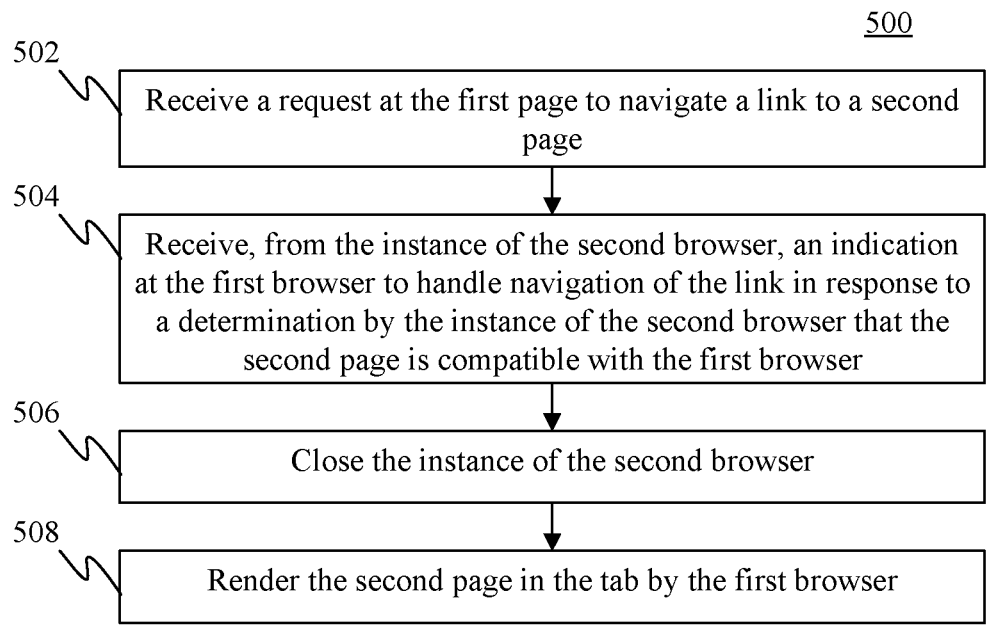
Figure 6:
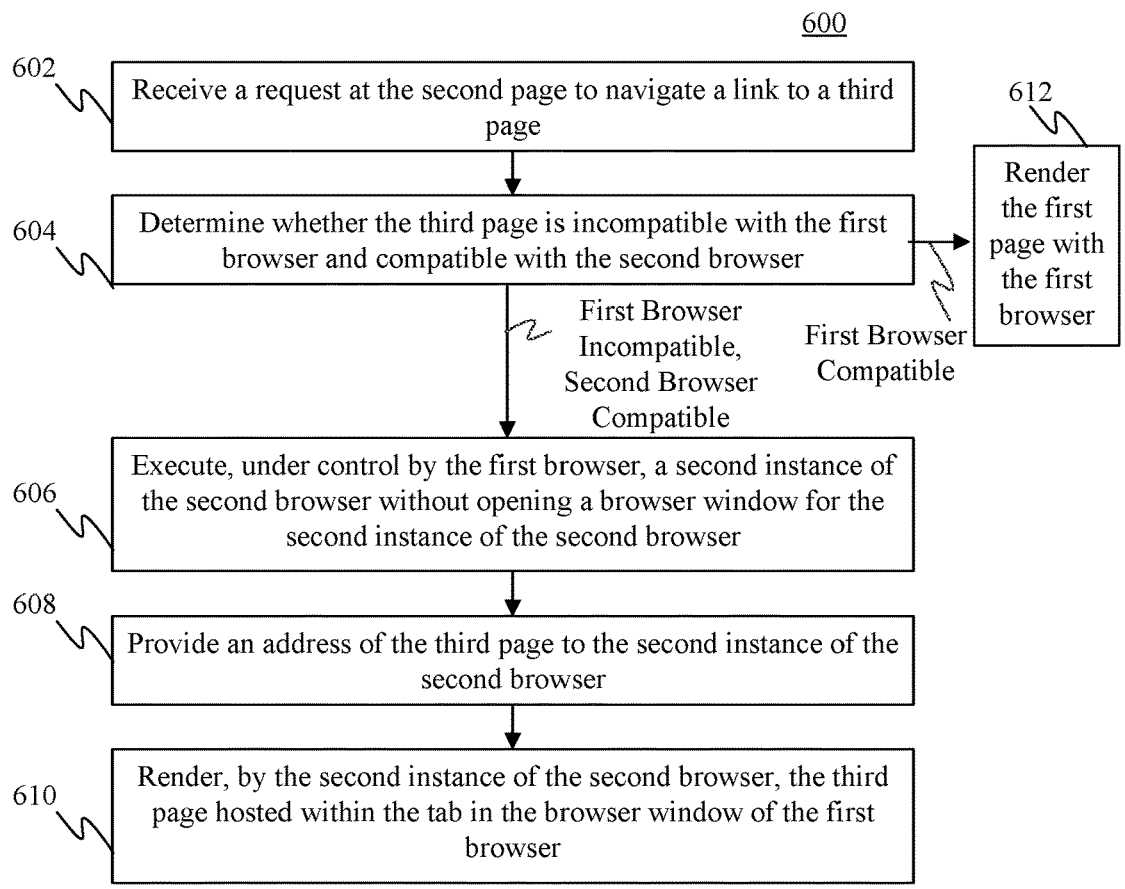

As noted above, and in embodiments, users may navigate from pages rendered by either browser to subsequent pages that are compatible with one or both browsers. Depending on the compatibility of the subsequent page, a determination is made which browser is designated to render the page. Example embodiments for handling rendering of such subsequent pages are described as follows. For instance, FIGS. 4-6 show flowcharts of methods for managing page compatibility with the first and second browsers for additional pages, according to example embodiments. FIGS. 4-6 are described as follows.

For instance, a user may navigate from a page that is compatible with the second browser to a page that is also compatible with the second browser, but not the first browser. For example, FIG. 4 shows a flowchart 400 of a method for navigating a link to a second page compatible with the second browser, according to an example embodiment. In an embodiment, flowchart 400 may be implemented by host browser interface 112 of FIGS. 1A, 1B, and 3. For the purposes of illustration, flowchart 400 of FIG. 4 is described with continued reference to these figures. Other structural and operational embodiments will be apparent to persons skilled in the relevant art(s) based on the following discussion.

Flowchart 400 begins with step 402. In step 402, a request is received at the first page to navigate a link to a second page. For instance, and with reference to FIG. 1A and FIG. 3, browser determiner 314 may receive a request at first page 116 to navigate a link to a second page, such as by a link clink, a user typing in a URL address for the link, or the link being provided in another manner. Browser determiner 314 receives the request, rather than browser selector 302 at first browser 104, because the prior page (the first page) was compatible with second browser 106, and thus second browser 106 is active with regard to tab 114 and handles the next page (the second page).

In step 404, the instance of the second browser renders the second page hosted within the tab in response to a determination by the instance of the second browser that the second page is compatible with the second browser. For instance, browser determiner 314 may be configured to determine that the second page is compatible with second browser 106, such as by accessing a browser compatibility list as further described elsewhere herein. As such, second render engine 122 is configured to render a second page to be hosted within tab 114, in a similar fashion as first page 116 was rendered with respect to FIG. 1A. Because the second page is compatible with second browser 106, the currently invoked instance of second browser 106 (second browser (first instance) 106A) may be used to render the second page.

In step 406, the first browser is updated regarding the navigation of the link by the instance of the second browser. For instance, and with reference to FIG. 1A, FIG. 1B, and FIG. 3, host browser updater 318 may be configured to update first navigation history 312 of first browser 104 regarding the navigation of the link to a second page. In embodiments, and discussed in detail hereinafter, first navigation history 312 is maintained by first browser 104 to seamlessly enable navigation between pages of tab 114 whether or not the page is compatible with first browser 104 or second browser 106.

As noted above, in some situations, the page navigated to from the first page may be compatible with the first browser. For instance, FIG. 5 shows a flowchart 500 for rendering a second page in the tab that is compatible with the first browser, according to an example embodiment. In an embodiment, flowchart 500 may be implemented by multi-browser tab manager 108 of FIGS. 1A, 1B, and 3. For the purposes of illustration, flowchart 500 of FIG. 5 is described with continued reference to these figures. Other structural and operational embodiments will be apparent to persons skilled in the relevant art(s) based on the following discussion.

Flowchart 500 begins with step 502. In step 502, a request is received at the first page to navigate a link to a second page. For instance, and with reference to FIG. 1A, FIG. 1B, and FIG. 3, browser determiner 314 may receive a request at first page 116 to navigate a link to second page 118. Browser determiner 314 receives the request, rather than browser selector 302 at first browser 104, because the prior page (the first page) was compatible with second browser 106, and thus second browser 106 handles the next page (the second page). As noted above, the request may be initiated a link click in first page 116, etc. The navigation request may include an address, such as a URL, to second page 118.

In step 504, an indication is received from the instance of the second browser and at the first browser to handle navigation of the link in response to a determination by the instance of the second browser that the second page is compatible with the first browser. For instance, browser determiner 314 may determine that second page 118 is compatible with first browser 104, such as by reference to a browser compatibility list or in another manner. As such, browser determiner 314 may issue an instruction (e.g., an API call) to hosted browser controller 304 at first browser 104 to handle navigation of the link.

In step 506, the instance of the second browser is closed. In an embodiment, hosted browser controller 304 may be configured to issue an instruction to host browser interface 112 to close second browser (first instance) 106A. As shown in FIG. 1B, second browser (first instance) 106 is closed. In the event a subsequent page is to be opened that is compatible with second browser 106 but not first browser 104, a new instance of second browser 106 may be invoked.

In step 508, the second page is rendered in the tab by the first browser. First render engine 120 may be configured to render second page 118 in tab 114. As noted above, second page 118 is compatible with first browser 104 and thus is rendered by first render engine 120.

Figure 7:
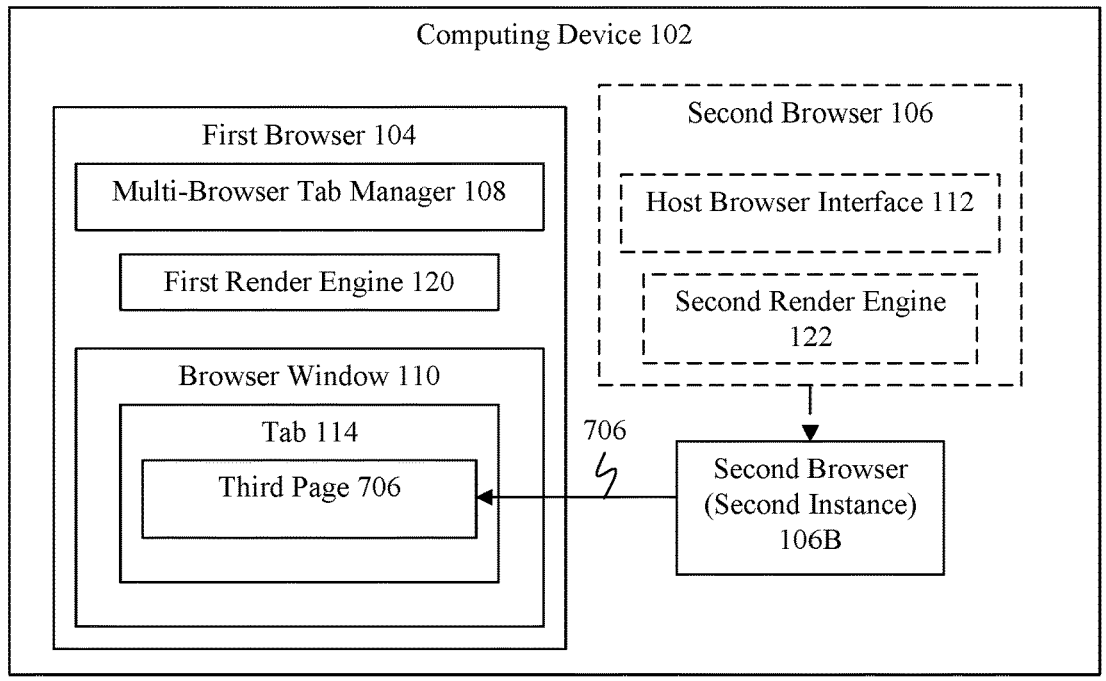
FIG. 7 shows a block diagram providing a view of the system of FIGS. 1A and 1B for a further page incompatible with the first browser but compatible with the second browser, according to an example embodiment.

FIG. 6 shows a flowchart 600 of a method for rendering a third page, according to an example embodiment. In an embodiment, flowchart 600 may be implemented by multi-browser tab manager 308 of FIGS. 1A, 1B, and 3, and may follow from flowchart 500 of FIG. 5. For the purposes of illustration, flowchart 600 of FIG. 6 is described with reference to FIG. 7. FIG. 7 shows a block diagram providing a view of the handling of a page incompatible with first browser 104 but compatible with second browser 106, according to an example embodiment. Other structural and operational embodiments will be apparent to persons skilled in the relevant art(s) based on the following discussion.

As shown in FIG. 6, flowchart 600 begins with step 602. In step 602, a request is received at the second page to navigate a link to a third page. For instance, browser selector 302 at first browser 104 may receive a request from second page 116 to navigate a link to third page 706.

In step 604, it is determined by the first browser whether the third page is incompatible with the first browser and compatible with the second browser. For instance, browser selector 302 may determine that third page 706 is compatible with second browser 106 and incompatible with first browser 104 based on reference to a browser compatibility list, or in another manner. In this case, flowchart 600 continues to step 606. Alternatively, browser selector 302 may determine that the third page is compatible with first browser 104. In such case, flowchart 600 continues to step 612.

In step 606, a second instance of the second browser is executed without a browser window opening for the second instance of the second browser. For instance, hosted browser controller 304 may be configured to invoke second browser (second instance) 106B without opening a browser window for second browser 106. As noted above, such communication may be performed via API communications or in another manner. Second browser (second instance) 106B is referred to as a second instance of browser 106 because first browser (second instance) 106A was previously invoked and subsequently closed (e.g., per step 506 of FIG. 5). As shown in FIG. 7, second browser (second instance) 106B includes host browser interface 112 and second render engine 122.

In step 608, an address of the third page is provided to the second instance of the second browser. For instance, as shown in FIG. 7, hosted browser controller 304 at first browser 104 may provide an address of the link for third page 706 to second browser (second instance) 106B in a same communication as the invocation request (step 606) or in a separate communication.

In step 610, the third page is rendered by the second instance of the second browser and hosted within the tab in the browser window of the first browser. For instance, as shown in FIG. 7, second render engine 122 may be configured to render third page 706 hosted within tab 114 of browser window 110. In this manner, third page 706 is enabled to be rendered within first browser 104 even though not compatible with first browser 104. Furthermore, third page 706 is rendered without a browser window being opened for second browser 106, as described elsewhere herein. Flowchart 600 ends after step 612.

In step 612, the first page is rendered by the first browser. When third page 706 is determined to be compatible with first browser 104, first render engine 120 of first browser 104 renders third page 706 in tab 114 in a normal fashion. Flowchart 600 ends after step 612.

Accordingly, in the embodiments described above, any sequence of page openings may be performed by browsers 104 and 106 in tab 114. When a link to a page compatible with first browser 104 is received, first browser 104 may handle the opening of the page in tab 114 in a normal fashion. When a link to a page compatible with second browser 106 is received, second browser 106 may handle the opening of the page in tab 114 in a hosted fashion. Any number and ordering of pages may be received and opened in tab 114 of first browser 104 regardless of which of browsers 104 and 106 the pages are compatible with.

For example, when a current page in tab 114 was opened by first browser 104, and a next link is received to a next page also compatible with first browser 104, first browser 104 may open the next page in tab 114 in a normal fashion. In another example, when a current page in tab 114 was opened by first browser 104, but a next link is received to a page incompatible with first browser 104 and compatible with second browser 106, browser selector 302 of first browser 104 makes this determination, and hosted browser controller 304 of first browser 104 invokes an instance of second browser 106 to open the page in tab 114 in a hosted fashion.

When a current page in tab 114 was opened by an instance of second browser 106, and a next link is received to a next page also incompatible with first browser 104 but compatible with second browser 106, the instance of second browser 106 may open the next page in tab 114 in a hosted fashion. However, when a current page in tab 114 was opened by the instance of second browser 106, but a next link is received to a page compatible with first browser 104, browser determiner 314 of second browser 106 makes this determination, and passes control back to first browser 104 to open the page in tab 114 in a normal fashion, while the instance of second browser 106 is closed.

B. Embodiments for Maintaining a Navigation History and Opening Pages Therefrom

Furthermore, as described above, such embodiments apply to history navigations (e.g., clicks on forward navigation or backward navigation buttons in a browser). Embodiments seamlessly manage rendering of pages within tab 114 by first browser 104 and second browser 106, depending on page browser compatibility.

For example, in an embodiment, first and second browsers 104 and 106 maintains a navigation history list that lists a sequence of page openings at the browsers in the forward and backward directions. In one embodiment, first and second browsers 104 and 106 share a same navigation history list. In another embodiment, first and second browsers 104 and 106 each maintain their own, respective navigation history lists. For instance, as shown in FIG. 3, first navigation history manager 310 of first browser 104 maintains a first navigation history 312, and second navigation history manager 320 of second browser 106 maintains a second navigation history 322. First and second navigation histories 312 and 322 may track page openings in a same or different manner, and may have same or different formats.

For instance, in an embodiment, first navigation history 312 may be stored in storage associated with first browser 104 (e.g., a "data store"), and be indicated as associated with tab 114. First navigation history manager 310 may record all page openings in first navigation history 312, regardless of whether first browser 104 or second browser 106 actually opened the pages, but a page record may have a format therein that depends on whether the page was opened by first browser 104 or second browser 106 in tab 114. If a page was opened by (compatible with) first browser 104, a page record for the page in first navigation history 312 may include a title of the page, a URL for the page, and page data for the page. The title of the page is a title that may be shown in a pop-up list of prior pages for the backward navigation button of first browser 104, or in a pop-up list of forward pages for the forward navigation button of first browser 104. The URL is the address of the page, which can be shown in the browser address bar. The page data is a cached version of the content of the page (e.g., one or more HTML files and/or included content). In contrast, if the page was opened by second browser 106, a page record for the page in first navigation history 312 may include an second browser identifier that identifies the page as being a second browser page (a page opened by second browser 106), the title of the page, a URL for the page, and one or more identifiers that can be used to find the page in storage associated with second browser 106. For example, the one or more identifiers may include a first identifier (e.g., a GUID—globally unique identifier) the identifies a storage structure in storage associated with second browser 106 that stores/caches page data for the page (e.g., as recovery storage), and a second identifier that identifies the page in that storage structure.

Furthermore, second navigation history 322 may be stored in storage associated with second browser 106, and be indicated as associated with tab 144. Second navigation history manager 320 may record in second navigation history 322 pages that were opened by second browser 106 (pages that were not compatible with first browser 104), but not pages opened by first browser 104. Instead of recording pages opened by first browser 104, second navigation history manager 320 may record in second navigation history 322 a first number of pages opened by first browser 104 before the pages opened by second browser 106, and a second number of pages opened by first browser 104 after the pages opened by second browser. In this manner, second navigation history manager 320 does not store in second navigation history 322 unnecessary information, but only records in pages opened by second browser 106 in a consecutive sequence, with first and second numbers of pages opened by first browser 104 indicated to either side of the sequence. With regard to what page information is stored, for a page opened by second browser 106, second navigation history manager 320 records in second navigation history 322 a title of the page, a URL for the page, and page data for the page. For a page opened by first browser 104, second navigation history manager 320 records nothing for the page in second navigation history 322, instead only tracking the first and second numbers of pages opened by first browser 104 as just described. In this way, the history of pages opened in tab 114 can be navigated whether they are compatible with first browser 104 or second browser 106.

Figure 8:
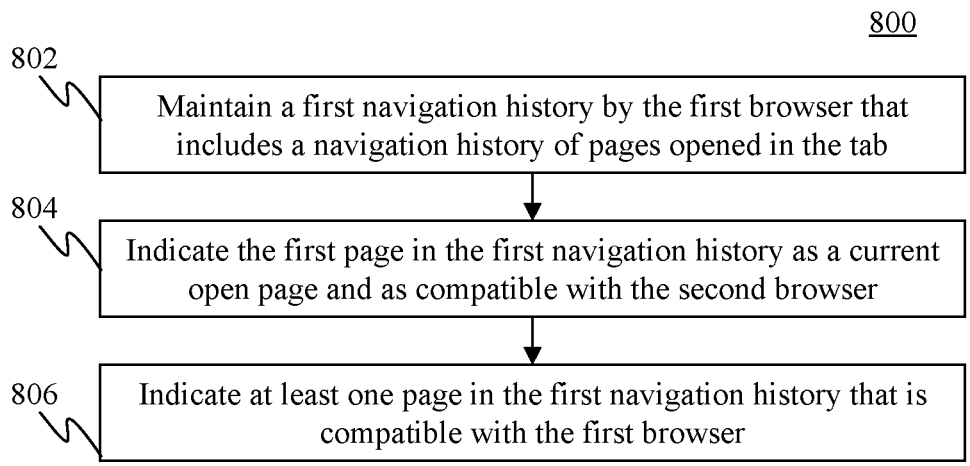
FIG. 8 shows a flowchart of a method for managing a navigation history for the first browser, according to an example embodiment.
Figure 9:
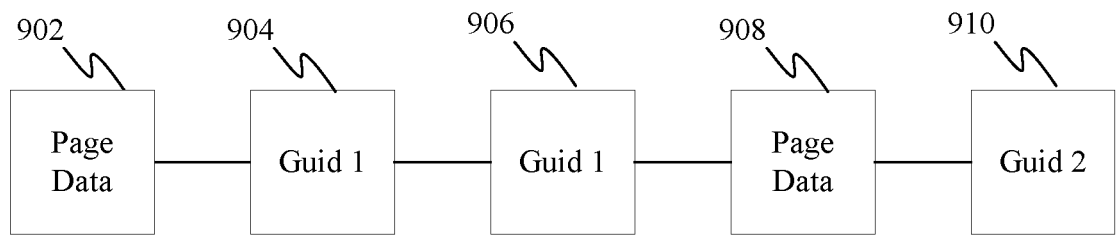
FIG. 9 shows a block diagram of a navigation history of the first browser, according to an example embodiment.

FIGS. 8-13B further illustrate this handling of history navigations by users at first browser 104, including history navigations to and from pages handled by second browser 106. For instance, FIG. 8 shows a flowchart 800 of a method for managing a navigation history for first browser 104, according to an example embodiment. For example, first navigation history manager 310 may manage first navigation history 312 according to flowchart 800. For illustrative purposes, flowchart 800 is described with reference to FIG. 9, which shows a block diagram of a navigation history 900 that is an example of navigation history 312 maintained at first browser 104. As shown in FIG. 9, navigation history 900 includes a first page entry 902, a second page entry 904, a third page entry 906, a fourth page entry 908, and a fifth page entry 910, which correspond to five consecutive pages opened in tab 114 of browser window 110. Other structural and operational embodiments will be apparent to persons skilled in the relevant art(s) based on the following discussion.

Flowchart 800 begins with step 802. In step 802, a first navigation history is maintained by the first browser that includes a navigation history of pages opened in the tab. For instance, first navigation history manager 310 of FIG. 3 may be configured to maintain first navigation history 312 for first browser 104 that includes a navigation history of pages opened in tab 114 from the perspective of first browser 104. FIG. 9 shows an example sequence of consecutive page openings in navigation history 900. In particular, page entry 902 is a page record for a page opened by first browser 104. As such, page entry 902 includes page information described above for such pages, including title, URL, and page data. Page entries 904 and 906 are page records for pages opened by a first instance of second browser 106, such as second browser (first instance) 106A. The pages for page entries 904 and 906 were opened by a same instance of second browser 106 because they are sequential. Page entries 904 and 906 each include simplified page information as described above, including title, URL, sequence identifier (identifying a sequence position of the page in the pages listed in navigation history for the first instance of second browser 106), and storage structure identifier (for a store structure for the first instance of second browser 106 that stores the pages in the navigation history of the first instance of second browser 106) (also referred to as a "browser storage identifier"). Note that each page in a contiguous sequence of pages opened by the first instance of second browser 106 are assigned a same value for the browser storage identifier, because their respective page data is stored in a same storage structure by the first instance of second browser 106 (each instance of second browser 106 that is opened has an associated storage structure having a corresponding browser storage identifier). Page entry 908 is a page record for a page opened by first browser 104, and thus includes title, URL, and page data. Page entry 910 is a page record for a page opened by a second instance of second browser 106, such as second browser (second instance) 106B. Thus, page entry 910 includes simplified page information as described above, including title, URL, sequence identifier, and storage structure identifier (for a store structure for the second instance of second browser 106). Page entry 910 is a page record for a page opened by the second instance of second browser 106 because the first instance of second browser 106 was closed when first browser 104 opened the page having page record 908. Thus, the second instance of second browser 106 had to be opened to open the page associated with page record 910.

In step 804, the first page is indicated in the first navigation history as a current open page and as compatible with the second browser. For example, the page corresponding to page entry 904 in FIG. 9 is compatible with second browser 106. When this page is opened in tab 114, this page is considered the current open page. At this point, page entry 904 is created in navigation history 900 by first navigation history manager 310. The data (e.g., metadata) entered into page entry 904 is received by navigation history manager 310 from host browser updater 318 at second browser 106. Host browser updater 318 is configured to update first browser 104 with the page entry data (e.g., title, URL, sequence identifier, and storage structure identifier) for any pages opened by an instance of second browser 106.

In step 806, at least one page in the first navigation history is indicated as compatible with the first browser. For instance, as shown in FIG. 9, the pages corresponding to page entries 902 and 908 are compatible with first browser 104. As such, the pages are rendered by first render engine 120 at first browser 104, and first navigation history manager 310 creates page entries 902 and 908 for them with the applicable page entry data (e.g., title, URL, and page data).

Figure 10:
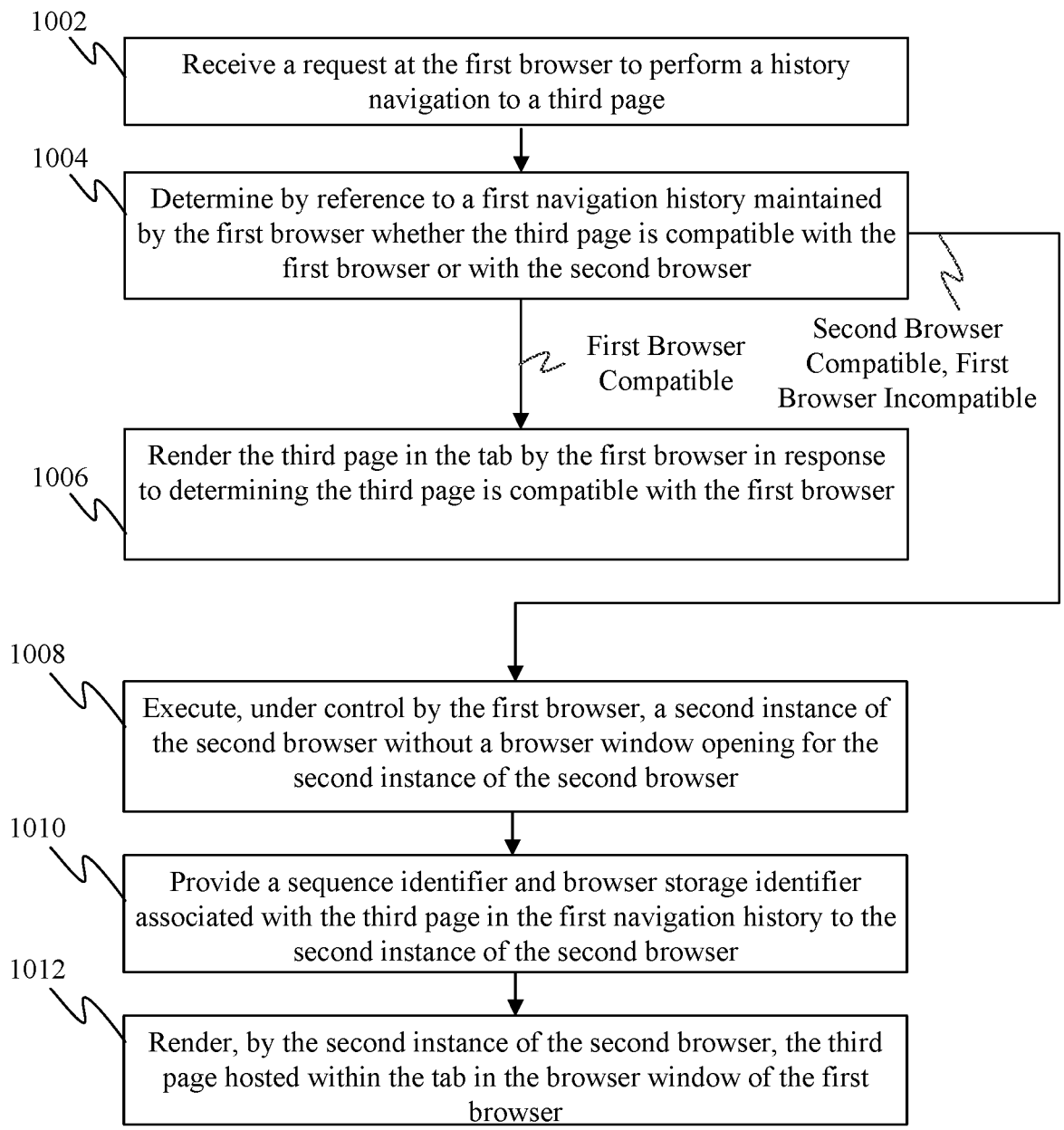
FIG. 10 shows a flowchart of a method for performing a history navigation at the first browser, according to an example embodiment.

FIG. 10 shows a flowchart 1000 of a method for performing a history navigation at first browser 104, according to an example embodiment. For purposes of illustration, flowchart 1000 is described with continued reference to FIG. 9. Other structural and operational embodiments will be apparent to persons skilled in the relevant art(s) based on the following discussion.

Flowchart 1000 begins with step 1002. In step 1002, a request to perform a history navigation to a third page is received at the first browser. For instance, history navigator 306 may be configured to receive history navigations received at first browser 104. For instance, a user may click on a back or forward button of the browser, may select a backward or forward page from a backward or forward pulldown menu to navigate to, or may receive a history navigation request in another manner. In response, history navigator 306 provides an indication of the history navigation to browser selector 302, the indication including whether the navigation was forward or backward, and how backward or forward in number of pages.

For instance, and with reference to FIG. 9, a request may be received to perform a history navigation from the page of page entry 908 to the page of page entry 906 (i.e., backward by 1 page).

In step 1004, it is determined by reference to a first navigation history maintained by the first browser whether the third page is compatible with the first browser or the second browser. For instance, and with reference to FIG. 3, browser selector 302 may be configured to determine by reference to first navigation history 312 maintained by first browser 104 whether the third page is compatible with the first browser or the second browser. For instance, and with reference to FIG. 9, browser selector 302 may determine that the page of page entry 906 is incompatible with first browser 104 based on the content of page entry 906 (i.e., whether an indication of second browser 106 is present in page entry 908). As shown in FIG. 10, if it is determined that the third page is compatible with first browser 104, flowchart 1000 proceeds to step 1006. Alternatively, if it is determined that the third page is incompatible with first browser 104 and compatible with second browser 106, flowchart 1000 proceeds to step 1008.

In step 1006, the third page is rendered in the tab by the first browser in response to determining that the third page is compatible with the first browser. For instance, and with reference to FIG. 3, first render engine 120 may be configured to render the third page in tab 114. As noted above, first render engine 120 may be configured to navigate to the URL of the page found in the page record, retrieve the page, and then render the page.

In step 1008, a second instance of the second browser is executed under control by the first browser without a browser window opening for the second instance of the second browser. For instance, when the page being opened is not compatible with first browser 104, but is compatible with second browser 106, hosted browser controller 304 may be configured to invoke second browser (second instance) 106B without opening a browser window for second browser 106.

In step 1010, a sequence identifier and browser storage identifier associated with the third page in the first navigation history is provided to the second instance of the second browser. For instance, and with reference to FIG. 3 and FIG. 7, hosted browser controller 304 may be configured to provide the sequence identifier and browser storage identifier associated with the third page in first navigation history 312 to second browser (second instance) 106B. Continuing the example of above, where a history navigation is received from the page of page entry 908 to the page of page entry 906, the URL may be found in page entry 906.

In step 1012, the third page is rendered by the second instance of the second browser and hosted within the tab in the browser window of the first browser. For instance, and with reference to FIG. 7, second render engine 122 renders third page 706 within tab 114. Continuing the example of above, where a history navigation is received from the page of page entry 908 to the page of page entry 906, second render engine 122 renders in tab 114 the page at the URL found in page entry 906 by accessing the page in second navigation history 322 by the received browser storage identifier (that identifies second navigation history 322 from other navigation histories that may be maintained for other instances of second browser 106) and the received sequence identifier (identifying the page in the sequence of pages in second navigation history 322). In this manner, the user is enabled to seamlessly navigate from a page compatible with first browser 104 to a page compatible with second browser 106.

Figure 11:
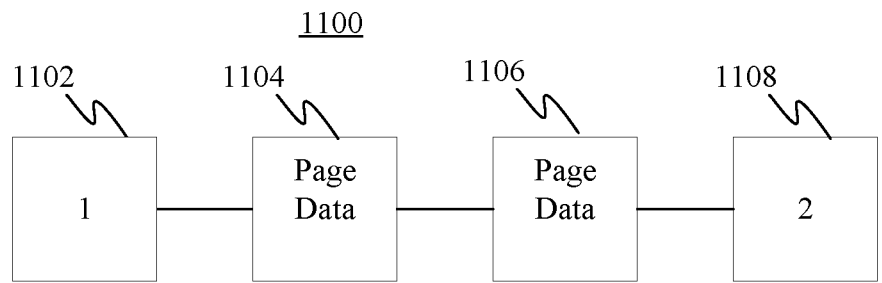
FIG. 11 shows a block diagram of a navigation history of the second browser, according to an example embodiment.
Figure 12:
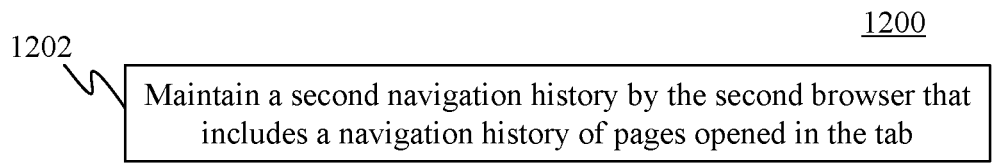
FIG. 12 shows a flowchart of a method for maintaining a navigation history for the second browser, according to an example embodiment.

As noted above, second navigation history 322 maintained at second browser 106 may be referenced by browser determiner 314 to make the browser selection for rendering a page arrived at by a history navigation. For instance, FIG. 11 shows a block diagram of a navigation history 1100 that is an example of navigation history 322 maintained at second browser 106. As shown in FIG. 11, navigation history 1100 includes a sequence of page openings in the form of page entries, including a first page entry 1102, a second page entry 1104, a third page entry 1106, and a fourth page entry 1108. First-fourth page entries 1102-1108 correspond to first-fifth page entries 902-910 of FIG. 9. For the purposes of illustration, FIG. 11 is described with reference to flowchart 1200 of FIG. 12. FIG. 12 shows a flowchart 1200 of a method for maintaining a navigation history for the second browser, according to an example embodiment. Other structural and operational embodiments will be apparent to persons skilled in the relevant art(s) based on the following discussion.

Flowchart 1200 begins with step 1202. In step 1202, a second navigation history is maintained by the second browser that includes a navigation history of pages opened in the tab. As described above, second navigation history manager 320 (FIG. 3) may be configured to maintain second navigation history 322 for second browser 106. Second navigation history 322 includes a navigation history of pages opened in tab 114 from the perspective of second browser 106. As noted above, second navigation history manager 320 may record in second navigation history 322 a first number of pages opened by first browser 104 before the pages opened by the current instance of second browser 106 (an instance of second browser 106 opened by first browser 104 and currently executing), and a second number of pages opened by first browser 104 after the pages opened by the current instance of second browser 106.

For instance, and as shown in FIG. 11, page entry 1102 indicates a number of sequential pages opened by first browser 104 preceding the page of page entry 1104 opened by the current instance of second browser 106. In this case, a single page (1) compatible with first browser 104 was opened prior to the page of page entry 1104. Page entries 1104 and 1106 correspond to pages that were opened by the current instance of second browser (first instance) 106A. In embodiments, page entries 1104 include page information such as title, address, and page data. Page entry 1108 indicates pages opened by first browser 104 and the current instance of second browser 106 after the page of page entry 1106 opened by second browser 106 in second browser (first instance) 106A. In this case, two pages (2) compatible with first browser 104 were opened after the page of page entry 1106. Note that page entries 1102 and 1108 indicate page counts (prior and after, respectively) covering all the pages opened by first browser 104 and by any previously opened instances of second browser 106 (not including the current instance of second browser 106) in the navigational history of tab 114.

Figure 13:
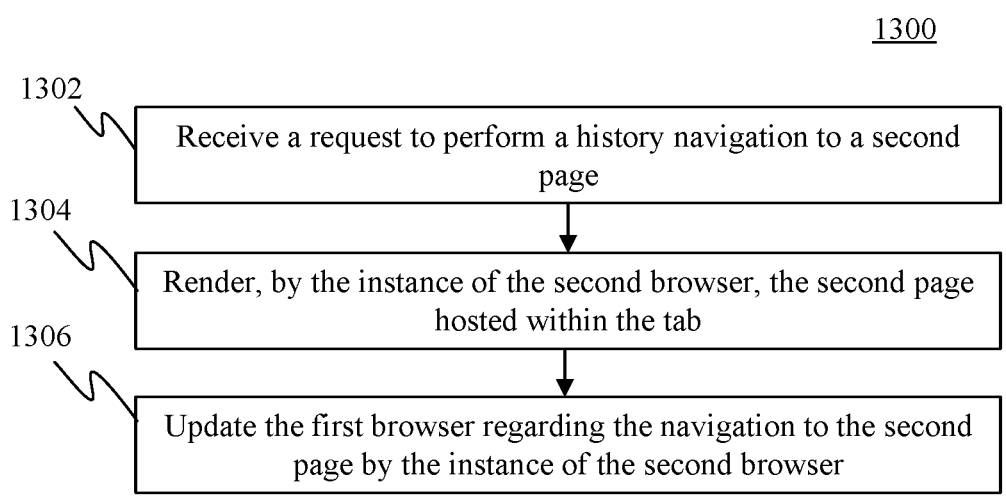
FIG. 13 shows a flowchart of a method for performing a history navigation for the second browser, according to an example embodiment.

FIG. 13 shows a flowchart 1300 of a method for performing a history navigation for second browser 106, according to an example embodiment. For the purposes of illustration, FIG. 13 is described with reference to FIGS. 3 and 11. Other structural and operational embodiments will be apparent to persons skilled in the relevant art(s) based on the following discussion.

Flowchart 1300 begins with step 1302. In step 1302, a request to perform a history navigation to a second page is received. For instance, history navigator 306 may receive a request to perform a history navigation to a second page when the prior page was opened by second browser 106. For instance, and with reference to FIG. 11, when the page of page entry 1104 is currently open in tab 114 by second browser 106, a request may be received to perform a forward history navigation by one page to the page of page entry 1106.

In step 1304, the second page hosted within the tab is rendered by the instance of the second browser. For instance, second render engine 122 of the currently executing instance of second browser 106 may render the second page.

In step 1306, the first browser is updated regarding the navigation to the second page by the instance of the second browser. For instance, first navigation history 312 at first browser 104 is updated regarding the navigation to the second page by host browser updater 318. For instance, host browser updater 318 may transmit to hosted browser controller 304 the page information such as title, address, GUID, and sequence identifier for the second page, for which first navigation history manager 310 may create a new page record in first navigation history 312, or may update a current page record in first navigation history 312 for the second page. The page record indicates the second page as opened by second browser 106 and includes the supplied page information.

Note that if the history navigation moved one page back from the page of page entry 1104, or two pages forward from the page of page entry 1104, page entry 1102 or page entry 1108 would be reached for second page. This means that the second page was previously opened by first browser 104. In this case, second browser 106 may send the history navigation information to hosted browser controller 304 to have first browser 104 open the second page as described elsewhere herein.

III. Example Computer System Implementation

Computing device 102, first browser 104, second browser 106 second browser (first instance) 106A, multi-browser tab manager 108, browser window 110, host browser interface 112, tab 114, first page 116, second page 118, browser selector 302, hosted browser controller 304, first navigation history manager 310, first render engine 120, history navigator 306, browser determiner 314, second render engine 122, host browser updater 318, second navigation history manager 320, second browser (second instance) 106B, third page 706, flowchart 200, flowchart 400, flowchart 500, flowchart 600, flowchart 800, flowchart 1000, flowchart 1200, and/or flowchart 1300 may be implemented in hardware, or hardware combined with one or both of software and/or firmware. For example, computing device 102, first browser 104, second browser 106 second browser (first instance) 106A, multi-browser tab manager 108, browser window 110, host browser interface 112, tab 114, first page 116, second page 118, browser selector 302, hosted browser controller 304, first navigation history manager 310, first render engine 120, history navigator 306, browser determiner 314, second render engine 122, host browser updater 318, second navigation history manager 320, second browser (second instance) 106B, third page 706, flowchart 200, flowchart 400, flowchart 500, flowchart 600, flowchart 800, flowchart 1000, flowchart 1200, and/or flowchart 1300 may be implemented as computer program code/instructions configured to be executed in one or more processors and stored in a computer readable storage medium.

Alternatively, computing device 102, first browser 104, second browser 106 second browser (first instance) 106A, multi-browser tab manager 108, browser window 110, host browser interface 112, tab 114, first page 116, second page 118, browser selector 302, hosted browser controller 304, first navigation history manager 310, first render engine 120, history navigator 306, browser determiner 314, second render engine 122, host browser updater 318, second navigation history manager 320, second browser (second instance) 106B, third page 706, flowchart 200, flowchart 400, flowchart 500, flowchart 600, flowchart 800, flowchart 1000, flowchart 1200, and/or flowchart 1300 may be implemented as hardware logic/electrical circuitry.

For instance, in an embodiment, one or more, in any combination, of computing device 102, first browser 104, second browser 106 second browser (first instance) 106A, multi-browser tab manager 108, browser window 110, host browser interface 112, tab 114, first page 116, second page 118, browser selector 302, hosted browser controller 304, first navigation history manager 310, first render engine 120, history navigator 306, browser determiner 314, second render engine 122, host browser updater 318, second navigation history manager 320, second browser (second instance) 106B, third page 706, flowchart 200, flowchart 400, flowchart 500, flowchart 600, flowchart 800, flowchart 1000, flowchart 1200, and/or flowchart 1300 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
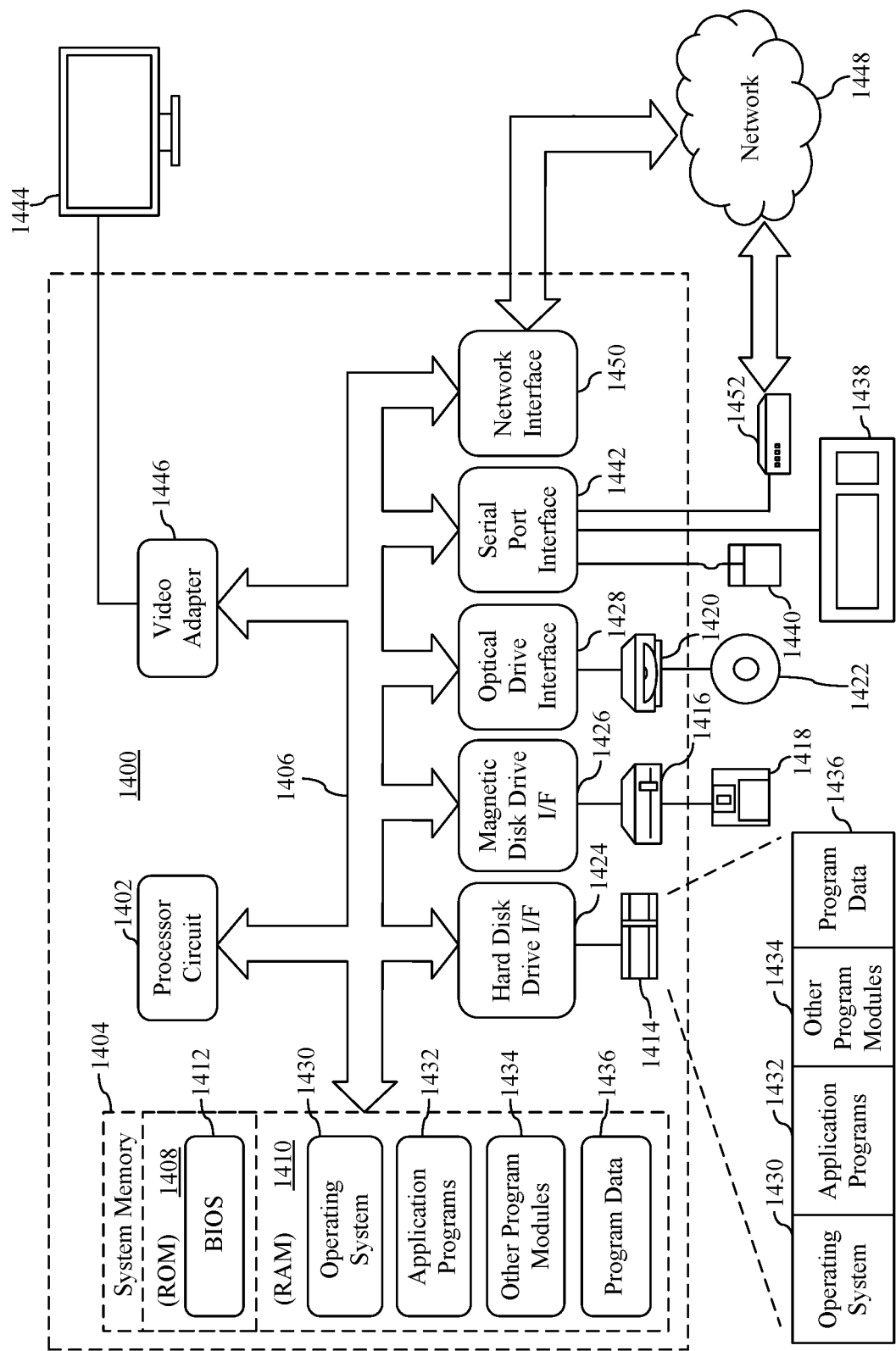
FIG. 14 is a block diagram of an example processor-based computer system that may be used to implement various embodiments.

FIG. 14 depicts an exemplary implementation of a computing device 1400 in which embodiments may be implemented. For example, computing device 102 may be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems, as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random-access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing any of the features of computing device 102, first browser 104, second browser 106 second browser (first instance) 106A, multi-browser tab manager 108, browser window 110, host browser interface 112, tab 114, first page 116, second page 118, browser selector 302, hosted browser controller 304, first navigation history manager 310, first render engine 120, history navigator 306, browser determiner 314, second render engine 122, host browser updater 318, second navigation history manager 320, second browser (second instance) 106B, third page 706, flowchart 200, flowchart 400, flowchart 500, flowchart 600, flowchart 800, flowchart 1000, flowchart 1200, and/or flowchart 1300 (or any one or more steps of such flowcharts), and/or further embodiments described herein.

A user may enter commands and information into computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method in a computing device is described herein. The method comprises executing a first browser in the computing device, the first browser having an open browser window; receiving a request at the first browser to navigate to a first page; determining that the first page is incompatible with the first browser and compatible with a second browser; executing, under control by the first browser, an instance of the second browser without a browser window opening for the instance of the second browser; providing an address of the first page to the instance of the second browser; and rendering, by the instance of the second browser, the first page hosted within a tab in the browser window of the first browser.

In one embodiment of the foregoing method, the method further comprises receiving a request at the first page to navigate a link to a second page; rendering, by the instance of the second browser, the second page hosted within the tab in response to a determination by the instance of the second browser that the second page is compatible with the second browser; and updating the first browser regarding the navigation of the link by the instance of the second browser.

In another embodiment of the foregoing method, the method further comprises receiving a request at the first page to navigate a link to a second page; receiving, from the instance of the second browser, an indication at the first browser to handle navigation of the link in response to a determination by the instance of the second browser that the second page is compatible with the first browser; closing the instance of the second browser; and rendering the second page in the tab by the first browser.

In another embodiment of the foregoing method, the method further comprises receiving a request at the second page to navigate a link to a third page; determining by the first browser that the third page is incompatible with the first browser and compatible with the second browser; executing, under control by the first browser, a second instance of the second browser without opening a browser window for the second instance of the second browser; providing an address of the third page to the second instance of the second browser; and rendering, by the second instance of the second browser, the third page hosted within the tab in the browser window of the first browser.

In another embodiment of the foregoing method, the method further comprises maintaining a first navigation history by the first browser that includes a navigation history of pages opened in the tab; indicating the first page in the first navigation history as a current open page and as compatible with the second browser; and indicating a least one page in the first navigation history that is compatible with the first browser.

In another embodiment of the foregoing method, the indication of the first page in the first navigation history includes at least one of: a second browser compatibility flag that identifies the first page as compatible with the second browser; a sequence identifier that identifies a sequence position of the first page in the pages listed in the first navigation history; and a browser storage identifier that identifies a data structure maintained by the instance of the second browser in which recovery data for the first page is stored, each page in a contiguous sequence of pages opened by the instance of the second browser having a same value for the browser storage identifier.

In another embodiment of the foregoing method, the method further comprises receiving a request at the first browser to perform a history navigation to a third page; determining by reference to a first navigation history maintained by the first browser whether the third page is compatible with the first browser or with the second browser; rendering the third page in the tab by the first browser in response to determining the third page is compatible with the first browser; and in response to determining the third page is a compatible with the second browser, execute, under control by the first browser, a second instance of the second browser without a browser window opening for the second instance of the second browser, providing a sequence identifier and browser storage identifier associated with the third page in the first navigation history to the second instance of the second browser, and rendering, by the second instance of the second browser, the third page hosted within the tab in the browser window of the first browser.

In another embodiment of the foregoing method, the method further comprises maintaining a second navigation history by the second browser that includes a navigation history of pages opened in the tab, including identifying each page of the navigation history that is compatible with the second browser with at least a sequence identifier that indicates a position in a sequence of pages in the navigation history that are compatible with the second browser, indicating a first number of sequential pages compatible with the first browser that precede the sequence, and indicating a second number of sequential pages compatible with the first browser that follow the sequence.

In another embodiment of the foregoing method, the method further comprises receiving a request to perform a history navigation to a second page; in response to a determination by the instance of the second browser by reference to a second navigation history maintained by the instance of the second browser that the second page is compatible with the second browser rendering, by the instance of the second browser, the second page hosted within the tab; and updating the first browser regarding the navigation to the second page by the instance of the second browser.

A system in a first browser configured to execute in a computing device is described herein. The system includes a browser selector configured to: receive a request to navigate to a first page, and determine that the first page is incompatible with the first browser and compatible with a second browser; a hosted browser controller configured to, in response to the determination, execute an instance of the second browser without a browser window opening for the instance of the second browser, and provide an address of the first page to the instance of the second browser; and a first render engine configured to enable the instance of the second browser to render the first page within a tab in a browser window of the first browser.

In one embodiment of the foregoing system, the instance of the second browser includes: a browser determiner configured to: receive a request received at the first page to navigate a link to a second page, and determine that the second page is compatible with the second browser; a render engine configured to: render the second page hosted within the tab; and a host browser updater configured to: update the first browser regarding the navigation of the link by the instance of the second browser.

In another embodiment of the foregoing system, the hosted browser controller is configured to: receive, from the instance of the second browser, an indication to handle navigation of a link to a second page in response to a determination by the instance of the second browser that the second page is compatible with the first browser, and close the instance of the second browser; and the first browser comprises: a first render engine configured to render the second page in the tab.

In another embodiment of the foregoing system, the browser selector is configured to: receive a request received at the second page to navigate a link to a third page, and determine that the third page is incompatible with the first browser and compatible with the second browser; the hosted browser controller is configured to execute a second instance of the second browser without a browser window opening for the second instance of the second browser, the second instance of the second browser including a second render engine; the second render engine is configured to: render the third page hosted within the tab; and the host browser updater is configured to: update the first browser regarding the navigation of the link to the third page by the instance of the second browser.

In another embodiment of foregoing system, the first browser further comprises: a navigation history manager configured to: maintain a navigation history configured to include a navigation history of pages opened in the tab; indicate the first page in the first navigation history as a current open page and as compatible with the second browser; and indicate at least one page in the first navigation history that is compatible with the first browser.

In another embodiment of the foregoing system, the indication of the first page in the first navigation history includes at least one of: a second browser compatibility flag that identifies the first page as compatible with the second browser; a sequence identifier that identifies a sequence position of the first page in the pages listed in the first navigation history; and a browser storage identifier that identifies a data structure maintained by the instance of the second browser in which recovery data for the first page is stored, each page in a contiguous sequence of pages opened by the instance of the second browser having a same value for the browser storage identifier.

In another embodiment of the foregoing system, the first browser further comprises: a history navigator configured to receive a request to perform a history navigation to a third page; the browser selector is configured to determine by reference to a first navigation history that the third page is compatible with the first browser; and the render engine is configured to render the third page in the tab.

In another embodiment of the foregoing system, the first browser further comprises: a history navigator configured to: receive a request to perform a history navigation to a third page; and the browser selector is configured to: determine by reference to a first navigation history that the third page is compatible with the second browser; and the hosted browser controller is configured to: execute a second instance of the second browser without a browser window opening for the second instance of the second browser, and provide a sequence identifier and browser storage identifier associated with the third page in the first navigation history to the second instance of the second browser, and the second instance of the second browser includes a second render engine configured to render the third page hosted within the tab in the browser window of the first browser.

In another embodiment of the foregoing system, the instance of the second browser comprises: a second navigation history manager configured to maintain a second navigation history configured to include a navigation history of pages opened in the tab; identify in the second navigation history each page of the navigation history that is compatible with the second browser with at least a sequence identifier that indicates a position in a sequence of pages in the navigation history that are compatible with the second browser; identify in the second navigation history a first number of sequential pages compatible with the first browser that precede the sequence; and identify in the second navigation history a second number of sequential pages compatible with the first browser that follow the sequence.

In another embodiment of the foregoing system, the first browser further comprises: a history navigator configured to receive a request to perform a history navigation to a second page; the browser determiner is configured to determine by reference to a second navigation history that the second page is compatible with the second browser; the instance of the second browser includes a render engine configured to render the second page hosted within the tab; and the host browser updater is configured to update the first browser regarding the navigation to the second page by the instance of the second browser.

A computer-readable medium having computer program logic recorded thereon that when executed by at least one processor causes the at least one processor to perform a method is described herein. The method comprises: executing a first browser in a computing device, the first browser having an open browser window; receiving a request at the first browser to navigate to a first page; determining that the first page is incompatible with the first browser and compatible with a second browser; executing, under control by the first browser, an instance of the second browser without a browser window opening for the instance of the second browser; providing an address of the first page to the instance of the second browser; and rendering, by the instance of the second browser, the first page hosted within a tab in the browser window of the first browser.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
executing a first browser in the computing device, the first browser having an open browser window
receiving a request at the first browser to navigate to a first page;
determining that the first page is incompatible with the first browser and compatible with a second browser;
executing, under control by the first browser, an instance of the second browser without a browser window opening for the instance of the second browser;
providing an address of the first page to the instance of the second browser; and
rendering, by the instance of the second browser, the first page hosted within a tab in the browser window of the first browser.

2. The method of claim 1, further comprising:
receiving a request at the first page to navigate a link to a second page;
rendering, by the instance of the second browser, the second page hosted within the tab in response to a determination by the instance of the second browser that the second page is compatible with the second browser; and
updating the first browser regarding the navigation of the link by the instance of the second browser.

3. The method of claim 1, further comprising:
receiving a request at the first page to navigate a link to a second page;
receiving, from the instance of the second browser, an indication at the first browser to handle navigation of the link in response to a determination by the instance of the second browser that the second page is compatible with the first browser;
closing the instance of the second browser; and
rendering the second page in the tab by the first browser.

4. The method of claim 3, further comprising:
receiving a request at the second page to navigate a link to a third page;
determining by the first browser that the third page is incompatible with the first browser and compatible with the second browser;
executing, under control by the first browser, a second instance of the second browser without opening a browser window for the second instance of the second browser;
providing an address of the third page to the second instance of the second browser; and
rendering, by the second instance of the second browser, the third page hosted within the tab in the browser window of the first browser.

5. The method of claim 1, further comprising:
maintaining a first navigation history by the first browser that includes a navigation history of pages opened in the tab;
indicating the first page in the first navigation history as a current open page and as compatible with the second browser; and
indicating a least one page in the first navigation history that is compatible with the first browser.

6. The method of claim 5, wherein the indication of the first page in the first navigation history includes at least one of:
a second browser compatibility flag that identifies the first page as compatible with the second browser;
a sequence identifier that identifies a sequence position of the first page in the pages listed in the first navigation history; and a browser storage identifier that identifies a data structure maintained by the instance of the second browser in which recovery data for the first page is stored, each page in a contiguous sequence of pages opened by the instance of the second browser having a same value for the browser storage identifier.

7. The method of claim 3, further comprising:
receiving a request at the first browser to perform a history navigation to a third page;
determining by reference to a first navigation history maintained by the first browser whether the third page is compatible with the first browser or with the second browser;
rendering the third page in the tab by the first browser in response to determining the third page is compatible with the first browser; and
in response to determining the third page is a compatible with the second browser,
  execute, under control by the first browser, a second instance of the second browser without a browser window opening for the second instance of the second browser,
  providing a sequence identifier and browser storage identifier associated with the third page in the first navigation history to the second instance of the second browser, and
  rendering, by the second instance of the second browser, the third page hosted within the tab in the browser window of the first browser.

8. The method of claim 1, further comprising:
maintaining a second navigation history by the second browser that includes a navigation history of pages opened in the tab, including
  identifying each page of the navigation history that is compatible with the second browser with at least a sequence identifier that indicates a position in a sequence of pages in the navigation history that are compatible with the second browser,
  indicating a first number of sequential pages compatible with the first browser that precede the sequence, and
  indicating a second number of sequential pages compatible with the first browser that follow the sequence.

9. The method of claim 1, further comprising:
receiving a request to perform a history navigation to a second page;
in response to a determination by the instance of the second browser by reference to a second navigation history maintained by the instance of the second browser that the second page is compatible with the second browser
  rendering, by the instance of the second browser, the second page hosted within the tab; and
  updating the first browser regarding the navigation to the second page by the instance of the second browser.

10. A system in a first browser configured to execute in a computing device, comprising:
a browser selector configured to:
  receive a request to navigate to a first page, and
  determine that the first page is incompatible with the first browser and compatible with a second browser;
a hosted browser controller configured to, in response to the determination,
  execute an instance of the second browser without a browser window opening for the instance of the second browser, and
  provide an address of the first page to the instance of the second browser; and
a first render engine configured to enable the instance of the second browser to render the first page within a tab in a browser window of the first browser.

11. The system of claim 10, wherein the instance of the second browser includes:
a browser determiner configured to:
  receive a request received at the first page to navigate a link to a second page, and
  determine that the second page is compatible with the second browser;
a render engine configured to:
  render the second page hosted within the tab; and
a host browser updater configured to:
  update the first browser regarding the navigation of the link by the instance of the second browser.

12. The system of claim 10, wherein
the hosted browser controller is configured to:
  receive, from the instance of the second browser, an indication to handle navigation of a link to a second page in response to a determination by the instance of the second browser that the second page is compatible with the first browser, and
  close the instance of the second browser; and
the first browser comprises:
  a first render engine configured to render the second page in the tab.

13. The system of claim 12, wherein the browser selector is configured to:
  receive a request received at the second page to navigate a link to a third page, and
  determine that the third page is incompatible with the first browser and compatible with the second browser;
the hosted browser controller is configured to
  execute a second instance of the second browser without a browser window opening for the second instance of the second browser, the second instance of the second browser including a second render engine;
the second render engine is configured to:
  render the third page hosted within the tab; and
the host browser updater is configured to:
  update the first browser regarding the navigation of the link to the third page by the instance of the second browser.

14. The system of claim 10, wherein the first browser further comprises:
a navigation history manager configured to:
  maintain a navigation history configured to include a navigation history of pages opened in the tab;
  indicate the first page in the first navigation history as a current open page and as compatible with the second browser; and
  indicate at least one page in the first navigation history that is compatible with the first browser.

15. The system of claim 14, wherein the indication of the first page in the first navigation history includes at least one of:
  a second browser compatibility flag that identifies the first page as compatible with the second browser;
  a sequence identifier that identifies a sequence position of the first page in the pages listed in the first navigation history; and a browser storage identifier that identifies a data structure maintained by the instance of the second browser in which recovery data for the first page is stored, each page in a contiguous sequence of pages opened by the instance of the second browser having a same value for the browser storage identifier.

16. The system of claim 12, wherein the first browser further comprises:
a history navigator configured to
receive a request to perform a history navigation to a third page;
the browser selector is configured to
determine by reference to a first navigation history that the third page is compatible with the first browser; and
the render engine is configured to
render the third page in the tab.

17. The system of claim 12, wherein the first browser further comprises:
a history navigator configured to:
receive a request to perform a history navigation to a third page; and
the browser selector is configured to:
determine by reference to a first navigation history that the third page is compatible with the second browser; and
the hosted browser controller is configured to:
execute a second instance of the second browser without a browser window opening for the second instance of the second browser, and
provide a sequence identifier and browser storage identifier associated with the third page in the first navigation history to the second instance of the second browser, and
the second instance of the second browser includes
a second render engine configured to render the third page hosted within the tab in the browser window of the first browser.

18. The system of claim 10, wherein the instance of the second browser comprises:
a second navigation history manager configured to
maintain a second navigation history configured to include a navigation history of pages opened in the tab;
identify in the second navigation history each page of the navigation history that is compatible with the second browser with at least a sequence identifier that indicates a position in a sequence of pages in the navigation history that are compatible with the second browser;
identify in the second navigation history a first number of sequential pages compatible with the first browser that precede the sequence; and
identify in the second navigation history a second number of sequential pages compatible with the first browser that follow the sequence.

19. The system of claim 10, wherein the first browser further comprises:
a history navigator configured to
receive a request to perform a history navigation to a second page;
the browser determiner is configured to
determine by reference to a second navigation history that the second page is compatible with the second browser;
the instance of the second browser includes
a render engine configured to render the second page hosted within the tab; and
the host browser updater is configured to
update the first browser regarding the navigation to the second page by the instance of the second browser.

20. A computer-readable medium having computer program logic recorded thereon that when executed by at least one processor causes the at least one processor to perform a method, the method comprising:
executing a first browser in a computing device, the first browser having an open browser window
receiving a request at the first browser to navigate to a first page;
determining that the first page is incompatible with the first browser and compatible with a second browser;
executing, under control by the first browser, an instance of the second browser without a browser window opening for the instance of the second browser;
providing an address of the first page to the instance of the second browser; and
rendering, by the instance of the second browser, the first page hosted within a tab in the browser window of the first browser.

* * * * *